(12) United States Patent
Kramer (10) Patent No.: US 7,302,046 B2
(45) Date of Patent: Nov. 27, 2007

(54) METHOD FOR THE DETECTION OF IMPEDANCES AND FOR THE QUALIFICATION OF THE TELEPHONE LINES

(75) Inventor: Ronalf Kramer, München (DE)

(73) Assignee: Infineon Technologies AG, Munich (DE)

( * ) Notice: Subject to any disclaimer, the term of this patent is extended or adjusted under 35 U.S.C. 154(b) by 208 days.

(21) Appl. No.: 10/518,321

(22) PCT Filed: Jun. 11, 2003

(86) PCT No.: PCT/EP03/06133

§ 371 (c)(1),
(2), (4) Date: Oct. 11, 2005

(87) PCT Pub. No.: WO03/107640

PCT Pub. Date: Dec. 24, 2003

(65) Prior Publication Data

US 2006/0115056 A1    Jun. 1, 2006

(30) Foreign Application Priority Data

Jun. 14, 2002    (DE) ............................... 102 26 759

(51) Int. Cl.
*H04M 1/24* (2006.01)
*H04M 3/08* (2006.01)
*H04M 3/22* (2006.01)

(52) U.S. Cl. ............... 379/22.02; 379/1.04; 379/27.03; 379/30

(58) Field of Classification Search ...... 379/1.03–1.04, 379/12, 16, 22.02, 22.07, 24, 27.02–27.03, 379/28, 29.01, 29.03, 30; 324/521, 523, 324/525, 527
See application file for complete search history.

(56) References Cited

U.S. PATENT DOCUMENTS 4,229,626 A    10/1980    Peoples (Continued)

FOREIGN PATENT DOCUMENTS

CA    2258404    6/2000

(Continued)

*Primary Examiner*—Binh K. Tieu
(74) *Attorney, Agent, or Firm*—Maginot, Moore & Beck (57) ABSTRACT

The invention relates to a method for detection of impedances, in particular along inductances, in telephone lines of the type with two metal wires as signal conductors (twisted pair), having the following method steps:
a test signal in the form of an AC voltage is fed into the telephone line,
a measurement signal of the reflection signal of the test signal is measured, which can be tapped off the input impedance of the entire line at the start of the line,
the first method steps are carried out at a number of different frequencies within a preselected frequency range of the AC voltage of the test signal,
the profile of the measurement signals is analyzed as a function of the frequency, with
the derivative of the profile of the measurement signals being formed based on the frequency,
at which point the second derivative of the profile of the measurement signals is formed based on the frequency,
the profile of the second derivative of the profile of the measurement signals based on the frequency is investigated for one or more mathematical sign changes.

The invention also relates to a method for qualification of telephone lines of the type with two metal wires as signal conductors (twisted pair) for suitability for data transmissions based on the DSL Standard, and to use of a DSL modem for carrying out methods such as this.

20 Claims, 9 Drawing Sheets

U.S. PATENT DOCUMENTS

| | | |
|---|---|---|
| 4,307,267 A | 12/1981 | Peoples |
| 4,620,069 A | 10/1986 | Godwin et al. |
| 4,870,675 A | 9/1989 | Fuller et al. |
| 5,404,388 A | 4/1995 | Eu |
| 5,465,287 A | 11/1995 | Egozi |
| 6,385,297 B2 * | 5/2002 | Faulkner et al. ........... 379/1.04 |
| 6,741,676 B2 * | 5/2004 | Rudinsky et al. ........ 379/27.04 |
| 2004/0028189 A1 * | 2/2004 | Bauer et al. ............... 379/1.01 |
| 2004/0062360 A1 * | 4/2004 | Holeva ...................... 379/1.04 |

FOREIGN PATENT DOCUMENTS

| | | |
|---|---|---|
| DE | 689 18 242 T2 | 4/1995 |
| WO | WO 99/14922 A1 | 3/1999 |

* cited by examiner

METHOD FOR THE DETECTION OF IMPEDANCES AND FOR THE QUALIFICATION OF THE TELEPHONE LINES

The invention relates to a method for detection of impedances, in particular serial inductances, in telephone lines with two metal wires as signal conductors, for qualification of telephone lines with two metal wires as signal conductors (twisted pair) for suitability for data transmissions based on the DSL Standard according to the precharacterizing clause of Claim 1, and to the use of a DSL modem for carrying out a method such as this.

In modern data transmission, which is used increasingly frequently and over ever larger areas, via conventional metallic telephone lines with two line cores (which are generally formed from copper wires), one problem that arises is that these lines, which were often laid decades ago, were not designed for transmission frequencies above 6 kHz.

Particularly in rural areas and in particular in the American area, lines have often been laid which were provided with so-called "load coils" in order to improve the transmission of frequencies in the range from 1 to 5 kHz. These are series inductances which were looped in pairs into the two line cores—provided with a common toroidal core—at regular intervals, for example with 66 mH in each case at intervals of 900 meters, or with 88 mH in each case at intervals of 1.2 km.

However, transmission frequencies above 5 kHz, in the range from several 10 to 100 kHz, must be possible for data transmission.

This is impossible in the presence of impedances, in particular the inductances which have been mentioned, whose purpose was to reduce the attenuation in the speech band, since they represent an excessively high impedance for high frequencies.

Since there are often no accurate records relating to the type of lines, or to whether inductances were or were not laid, the line must be qualified before it can be used for data transmission.

This is expensive and highly time-consuming, particularly when telephone company employees have to be sent out in order to measure the line.

U.S. Pat. Nos. 5,465,287 and 4,620,069 disclose methods for determination of line impedances, which are preferably carried out in digital switching centers for telephone networks. Further evaluation methods for determination of pole position and zero position frequency information, which make it possible to deduce that there are inductances on two-wire telephone lines, are described in U.S. Pat. Nos. 4,229,626 and 4,307,267. The methods according to the prior art have the primary disadvantage that it is either necessary to obtain complex additional devices, or the qualification of the respective telephone line cannot easily be carried out by the subscriber himself.

The object of the invention is to provide a method in which any impedances for qualification of a conventional telephone line can be detected at as low a cost as possible and with a high degree of reliability.

This object is achieved by a method for qualification of telephone lines according to Claim 1, and by use of a DSL modem according to Claim 11 and according to Claim 12.

The invention provides a method for detection of impedances, in particular along inductances (looped-in in series), in telephone lines with two metal wires as signal conductors in order to qualify them for their suitability for data transmission at frequencies above the speech band, having the following steps:
(a) a test signal in the form of an AC voltage is fed into the telephone line,
(b) a reflection signal of the test signal is measured, which can be tapped off as the component, reflected on the input impedance of the entire line, of the test signal fed in at the start of the line,
(c) the first two method steps (a) and (b) are carried out at a number of different frequencies within a preselected frequency range of the AC voltage of the test signal in order to measure any phase shift in the reflection signal with respect to the test signal at the respective frequency,
(d) the phase shift is analyzed as a function of the frequency in order to assess the telephone line, in which case:
the derivative of the phase shift is formed on the basis of the frequency,
the second derivative of the phase shift is formed,
the second derivative of the phase shift is investigated for one or more mathematical sign changes, and
in which case
when a mathematical sign change occurs in the second derivative of the phase shift, the telephone line is assessed as not being suitable for use for data transmission at frequencies above the speech band, without further technical actions.

The invention proposes that an AC voltage signal be fed in, which is, of course, partially reflected on the overall input impedance of the line. This reflected signal is then investigated for its line resistance. The phase shift is recorded as a measurement signal of the reflection signal with respect to the test signal. Investigation of the profile of the second derivative results in clear information as to whether there is any impedance in the line. This represents a considerable simplification in comparison to previous measurement methods, having a number of test steps which have to be carried out individually and manually.

This is used for qualification of telephone lines of the type with two metal wires as signal conductors (twisted pair) for suitability for data transmissions based on the DSL Standard. When there is a mathematical sign change in a second derivative of the phase difference between the measurement signal and the test signal over the frequency in a preselected frequency range, the line is assessed as not being suitable for use for data transmissions based on the DSL Standard, without further technical actions.

One preferred method step provides for the AC voltage to be a sinusoidal AC voltage. A sinusoidal AC voltage such as this can be generated and detected easily on a DSL modem card.

According to one advantageous refinement of the method, the phase shift is determined by means of a phase discriminator.

According to one refinement of the invention, which is likewise advantageous, the phase shift is determined by means of a quadrature demodulator.

One advantageous method step provides for the frequencies to be chosen to be between 1 and 5 kHz, in particular with regular or logarithmic intervals between the individual frequencies. The so-called load coils can be detected particularly well, especially in this frequency range.

One particularly advantageous and thus preferred method step provides that, before the second derivative of the profile of the measurement signals based on the frequency is formed, the individual measurement signals are averaged in order to smooth them in the profile. The smoothing is used to reduce the "noise components" (which are statistically independent with respect to the actual profile), and improves the capability to evaluate the data.

In consequence, median formation is carried out as the smoothing process according to one refinement of the invention.

One advantageous refinement of the method provides that, in a step which follows the median formation, individual smoothed measurement signals, which are at a regular interval from one another, are supplied for further evaluation. This leads to data reduction, which simplifies the evaluation process, and which does not result in any corruption of the results, owing to the previous smoothing of the data.

A further aspect of the invention provides for use of a DSL modem for carrying out the method as described above, using the data driver and receiving module which is provided in the DSL modem that is used. This makes it possible to use already existing hardware in a particularly simple manner, without any need for further developments.

Furthermore, the invention proposes the use of a DSL modem at the network provider end for carrying out the method mentioned above, in which case the test module which is present in the DSL modem that is used at the switching center end is used, which is often provided in a DSL modem at the network operator end, in order to make it possible to pass analog currents and/or voltages of different types to the line, and to measure them, in order to make it possible to carry out an electrical test on the line in this way. In this case as well, the advantages result from the use of already available hardware.

Further advantages, special features and expedient developments of the invention result from the further dependent claims or from sub-combinations of them.

The invention will be explained in more detail in the following text with reference to the drawing, in which.

Identical reference symbols in the figures denote identical elements or elements having the same effect.

Figure 1:
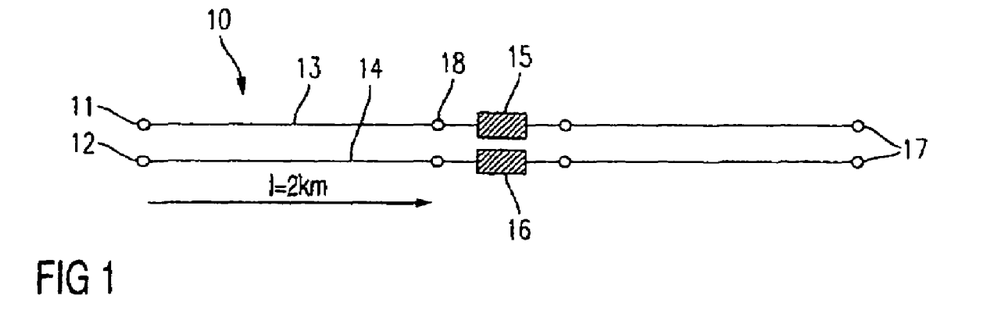
FIG. 1 shows a detail of a telephone line with load coils.

FIG. 1 shows a longitudinal detail of a telephone line from the start (feed points 11 and 12 for the two individual wires 13 and 14) of the line 10. Without the load coils 15 and 16 inserted in it, the characteristic impedance of the line is Zo.

The load coils in the example are looped-in in series (along the line) in the line at a distance of 2 km from the feed point, and then repeatedly after every 2 km. The coils are designed such that they reduce the line attenuation for frequencies in the speech band up to 3.4 kHz. However, at higher frequencies, the attenuation rises drastically, so that data transmission is impossible with all DSL methods.

It is thus necessary to use methods described here to determine whether an existing line is or is not provided with load coils, in order to determine its suitability for transmission methods which use considerably higher transmission frequencies (for example ISDN, VDSL, SDSL, ADSL).

The methods according to the invention allow such determination of suitability in the sense of the presence or absence of load coils in the line, without any additional test equipment, using solely the existing hardware together with associated software.

Figure 2:
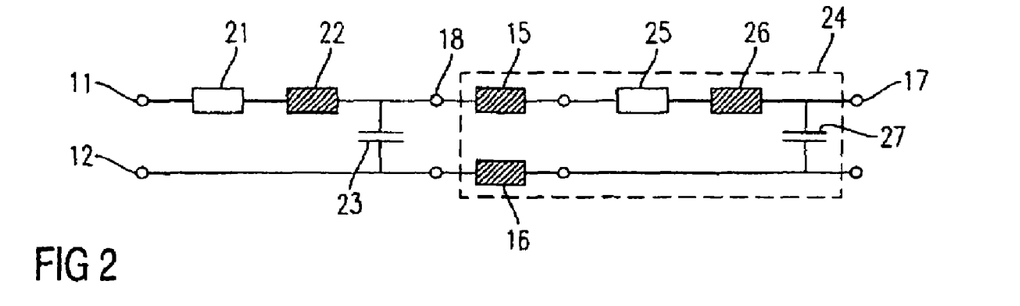
FIG. 2 shows an equivalent circuit of the line for low frequencies.

FIG. 2 shows the equivalent circuit of the line arrangement shown in FIG. 1 for low frequencies, for which the line length as far as the coil (in the example 1=2 km) is very much shorter than the wavelength.

For simple estimation purposes, the line elements of the pure wire line can be combined to form concentrated elements, specifically to form a resistor 21 (R'), the coil 22 (L') and the capacitor 23 (C').

The characteristic impedance of the line is changed from Zo to Zc by the incorporation of the load coils. The input impedance is obtained by terminating the equivalent circuit with the characteristic impedance Zc.

Zc takes account of the load coils.

Figure 3:
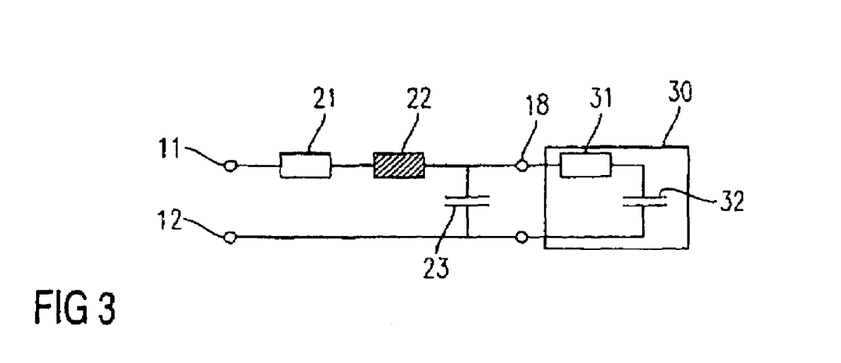
FIG. 3 shows an equivalent circuit of the entire line with load coils for low frequencies.

Zc thus has a high resistive and capacitive component for low frequencies, as is shown in the further simplified equivalent circuit as shown in FIG. 3 by the switching element 30, which replaces the further line and the coils, with the resistor 31 (Rc) and the capacitor 32 (Cc).

Figure 4:
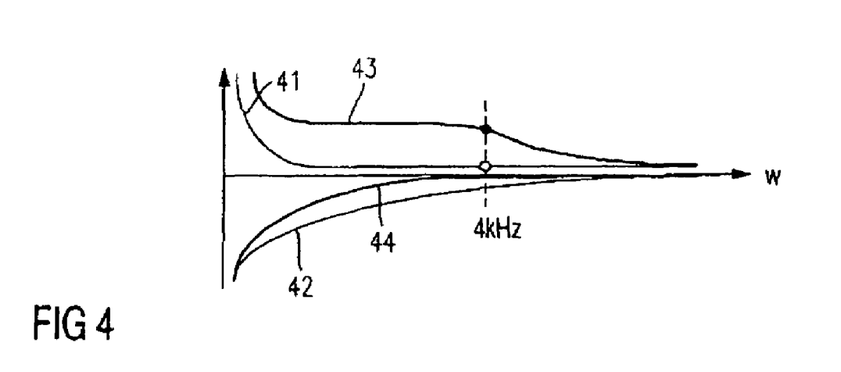
FIG. 4 shows the qualitative profile of the characteristic impedance Z as a function of the frequency.

The qualitative profile of the characteristic impedance plotted against the frequency w is shown in FIG. 4. The graph shows the real part of Zo 41 and the real part of Zc 43 (that is to say when coils are present), as well as the imaginary part of Zo 42 and of Zc 44. The curves differ noticeably from one another. The difference will become even more clear in the following text. In this case, however, it can be seen that the profile of the input impedance also has "ripples" in comparison to a line without load coils.

FIGS. 5 to 8 show the influence of constraints at the end 18 of a first line section 13 composed of wire. Three curves are in each case plotted, with a denoting a value profile for a line which is open at the end 18, b denoting a value profile for a line which is connected at the end 18 via a load coil to a further piece of line, and c denoting a value profile of a line which is connected at the end 18, without any coil, directly to a further piece of line.

Figures 5, 6:
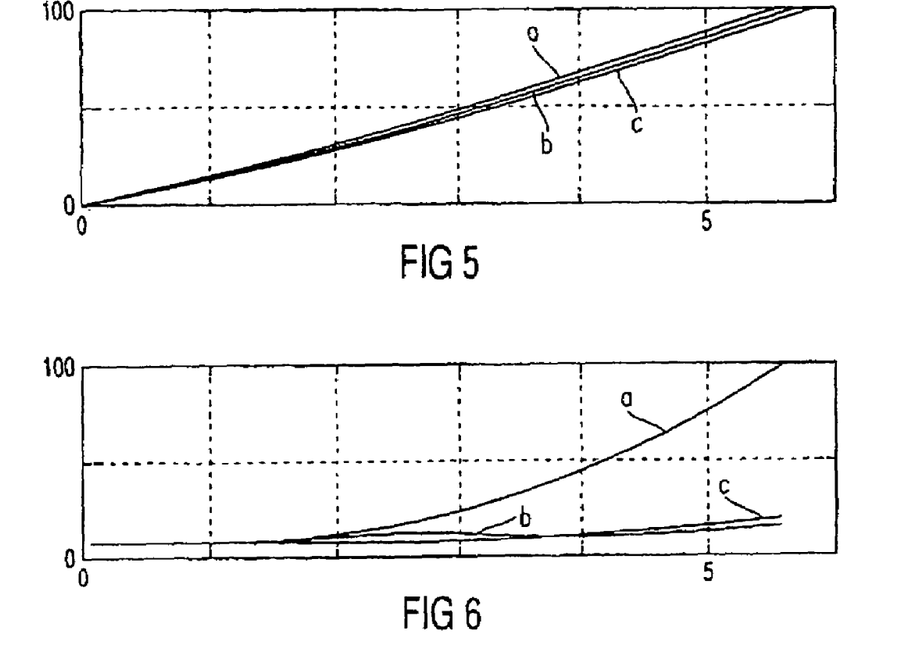
FIG. 5 shows the overall input impedance of the line plotted against the frequency.
FIG. 6 shows the real part of the input impedance of the line plotted against the frequency.
Figure 7:
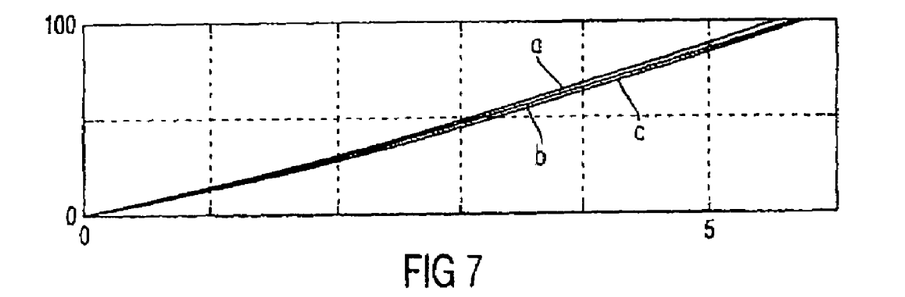
FIG. 7 shows the imaginary part of the input impedance of the line plotted against the frequency.
Figure 8:
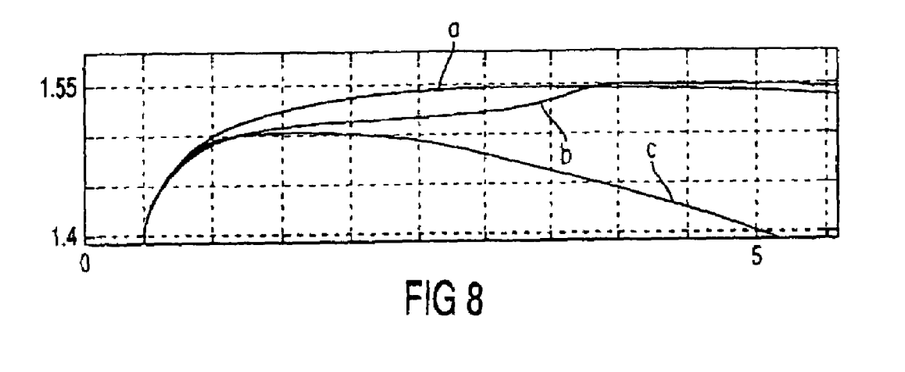
FIG. 8 shows the phase shift of the input impedance of the line plotted against the frequency.

FIG. 5 shows the magnitude of the input impedance of the line at the feed point (11, 12). FIG. 6 shows the real part of the input impedance. FIG. 7 shows the imaginary part of the input impedance and, finally, FIG. 8 shows the phase shift of the input impedance of the line.

As can clearly be seen, the difference can be evaluated in all the values, but is strongest in the phase profile, which appears to suggest that evaluation of the phase profile is preferable.

Figure 9:
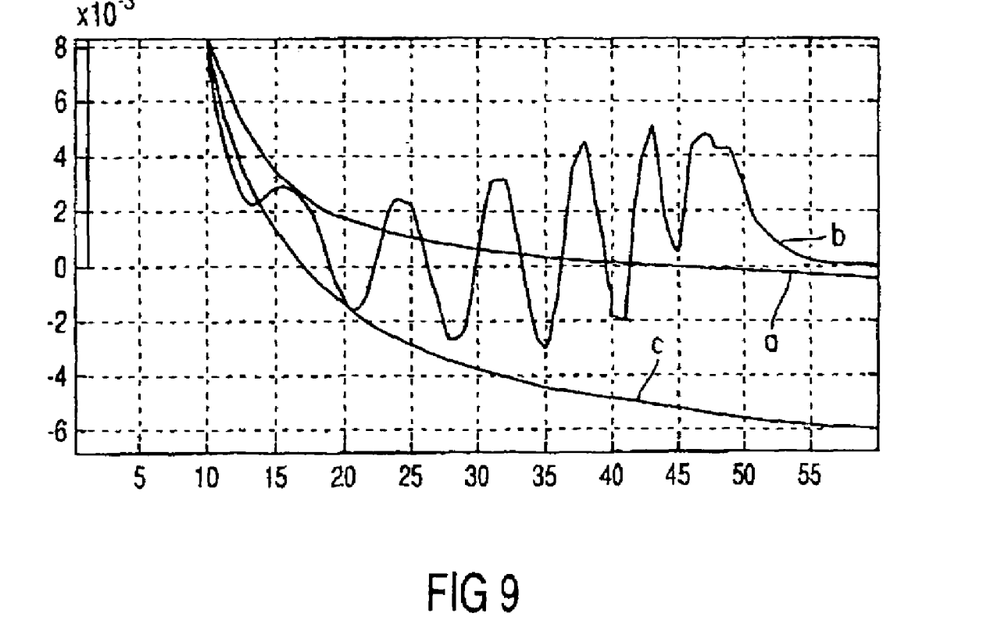
FIG. 9 shows the first derivative of the phase shift of the input impedance as a function of the frequency for different constraints.
Figure 10:
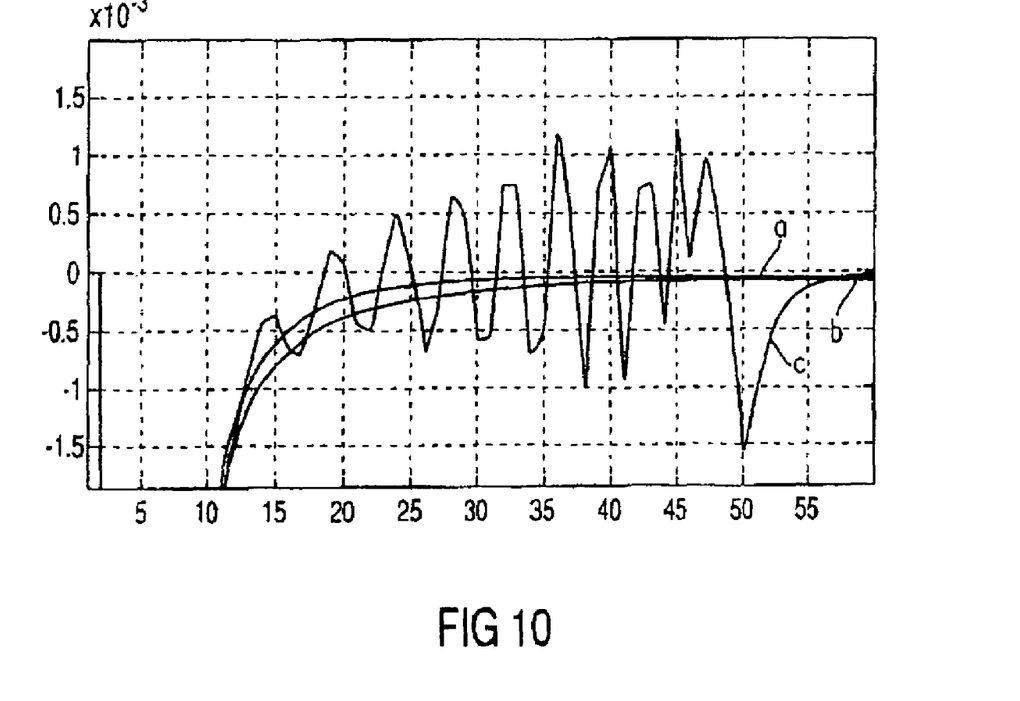
FIG. 10 shows the second derivative of the phase shift of the input impedance as a function of the frequency for different constraints.

In this context, FIGS. 9 and 10 once again show the typical profile of the phase shift of the first derivative (FIG. 9) and of the second derivative (FIG. 10) in more detail.

The described problem, that is to say the detection of the load coils, is solved by detecting the very different profiles of the characteristic impedances between a line with and without load coils in the lower frequency range (that is to say in the speech band), to be precise using the already existing hardware.

Figure 11:
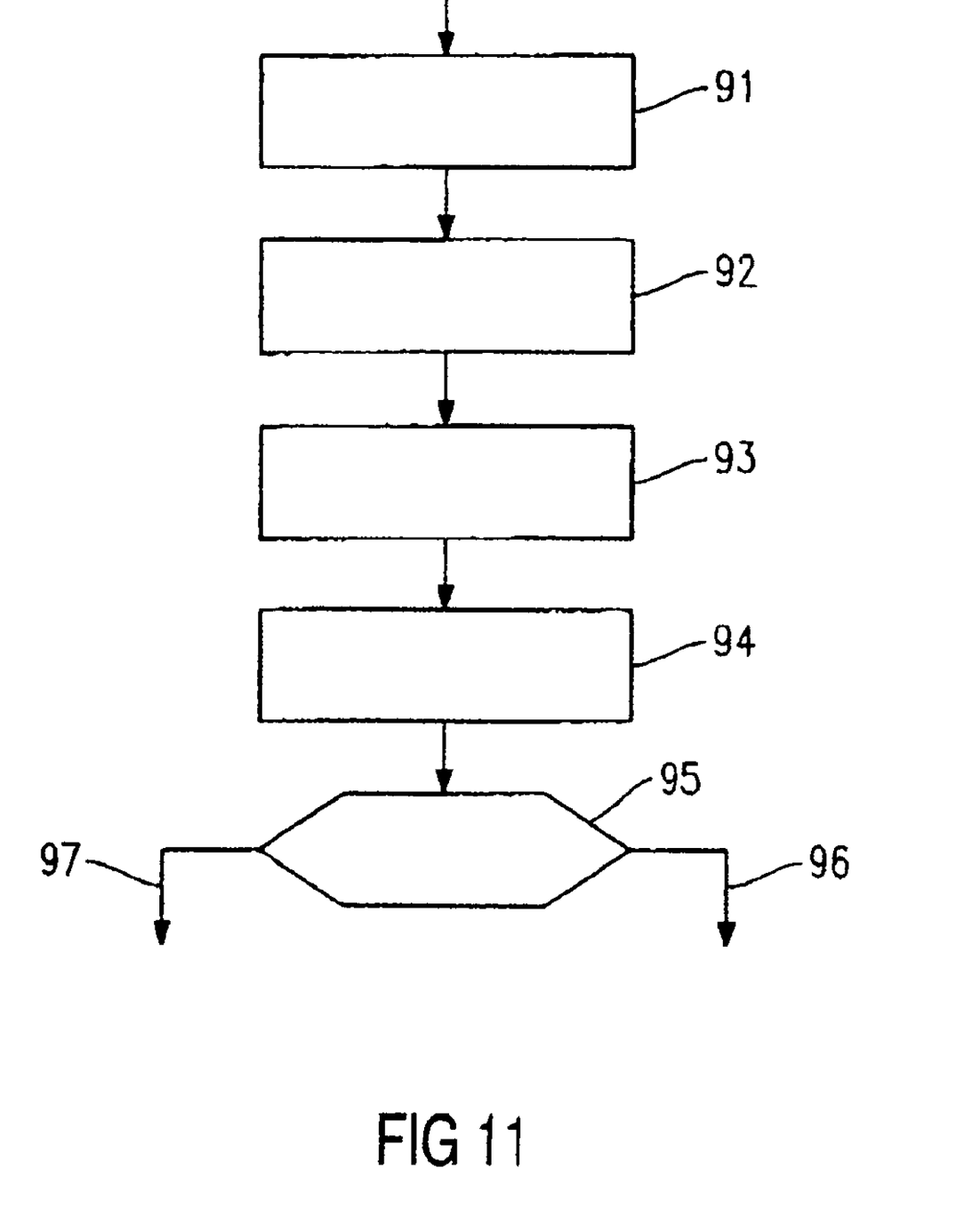
FIG. 11 shows a flowchart of the method.
Figure 12:
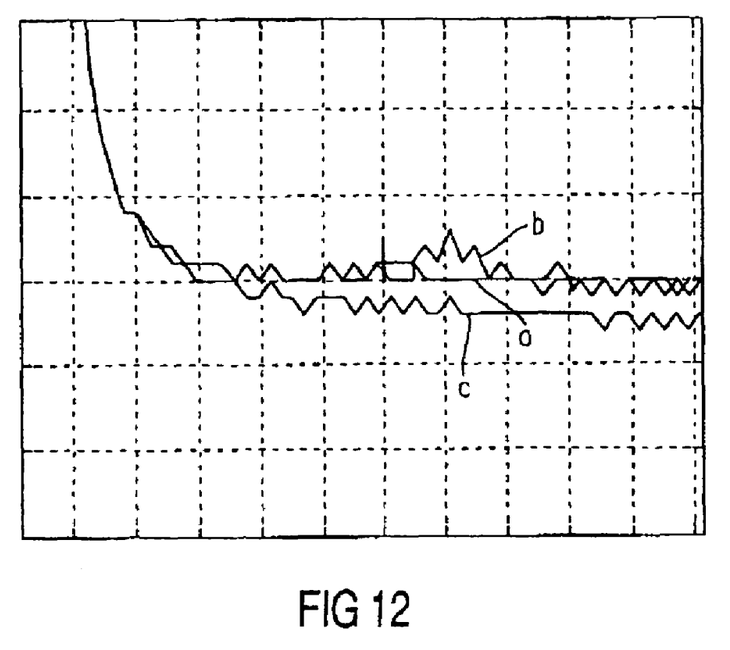
FIG. 12 shows a measurement example of a measured and calculated first derivative.
Figure 13:
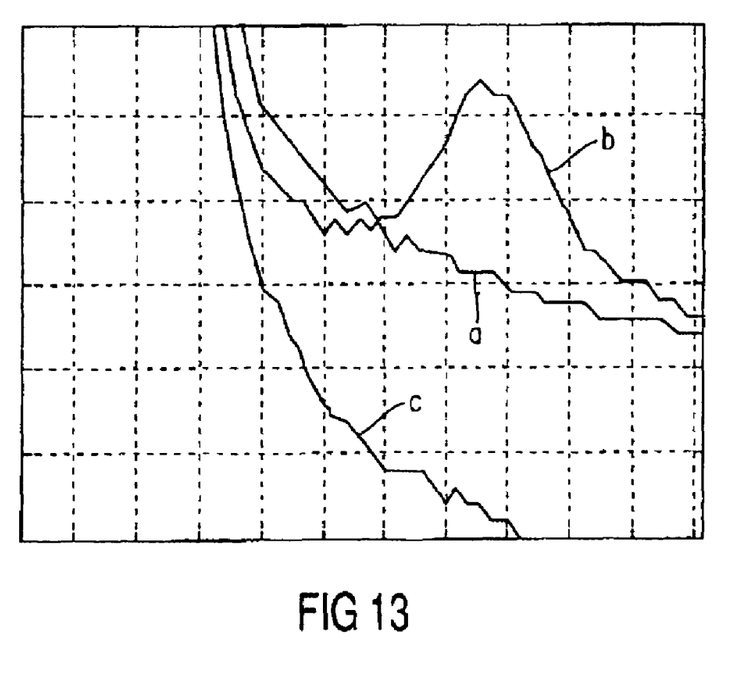
FIG. 13 shows a measurement example of a measured and calculated first derivative after averaging for smoothing.

FIG. 11 shows the procedure for the analysis part of the method after a test signal in the form of an AC voltage has been fed into the telephone line and the phase shift of the reflection signal of the test signal has been measured as the measurement signal at a number of different frequencies. For illustrative purposes, FIGS. 12 to 15 show the processing of the data records, once again with the boundary conditions a, b and c (see above).

The analysis method steps are carried out as follows: Analysis of the profiles of the measurement signals, with the derivative 91 of the profile of the measurement signals based on the frequency being formed (see FIG. 12 for a typical data record). The profile measurement signal is then subjected to averaging 92 by forming the median of the individual measurement signals in order to smooth their profile. In this case, by way of example, eight adjacent values may be smoothed jointly (see FIG. 13 for a typical data record).

Figure 14:
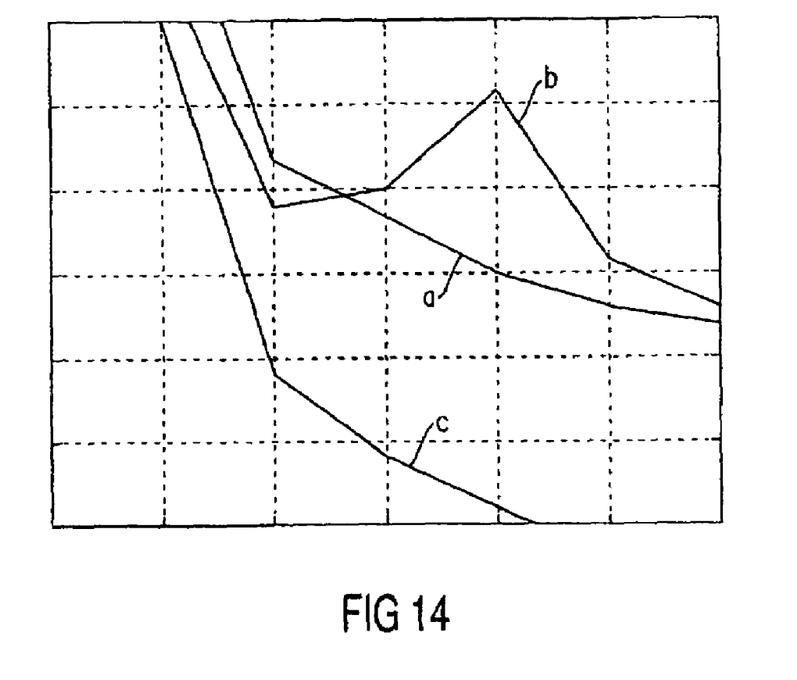
FIG. 14 shows a measurement example of a measured and calculated first derivative after data reduction has been carried out.

Data reduction 93 is carried out in the step following the median formation, in which only individual smoothed measurement signals, which are separated by regular intervals (for example only every eighth value) are supplied for further evaluation (see FIG. 14 for a typical data record).

Figure 15:
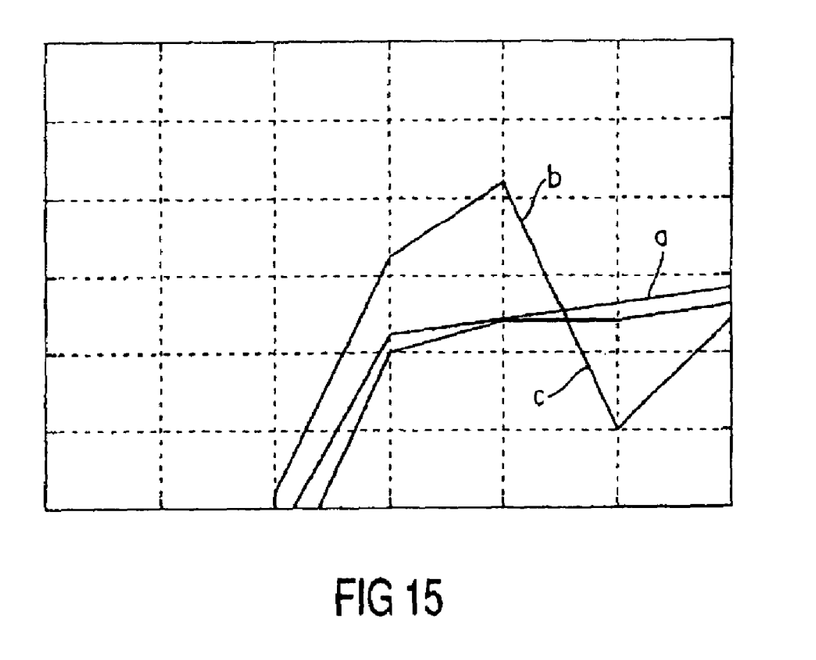
FIG. 15 shows a measurement example of a calculated second derivative.

The second derivative 94 of the profile of the reduced smoothed measurement signals is now produced on the basis of the frequency (see FIG. 15 for a typical data record).

All that now need be looked for is a mathematical sign change in the profile of the second derivative (95). These exist in lines which contain load coils, but no mathematical sign changes occur in lines without load coils. The mathematical sign change can be used to clearly deduce the presence (96) or absence (97) of load coils.

Figure 16:
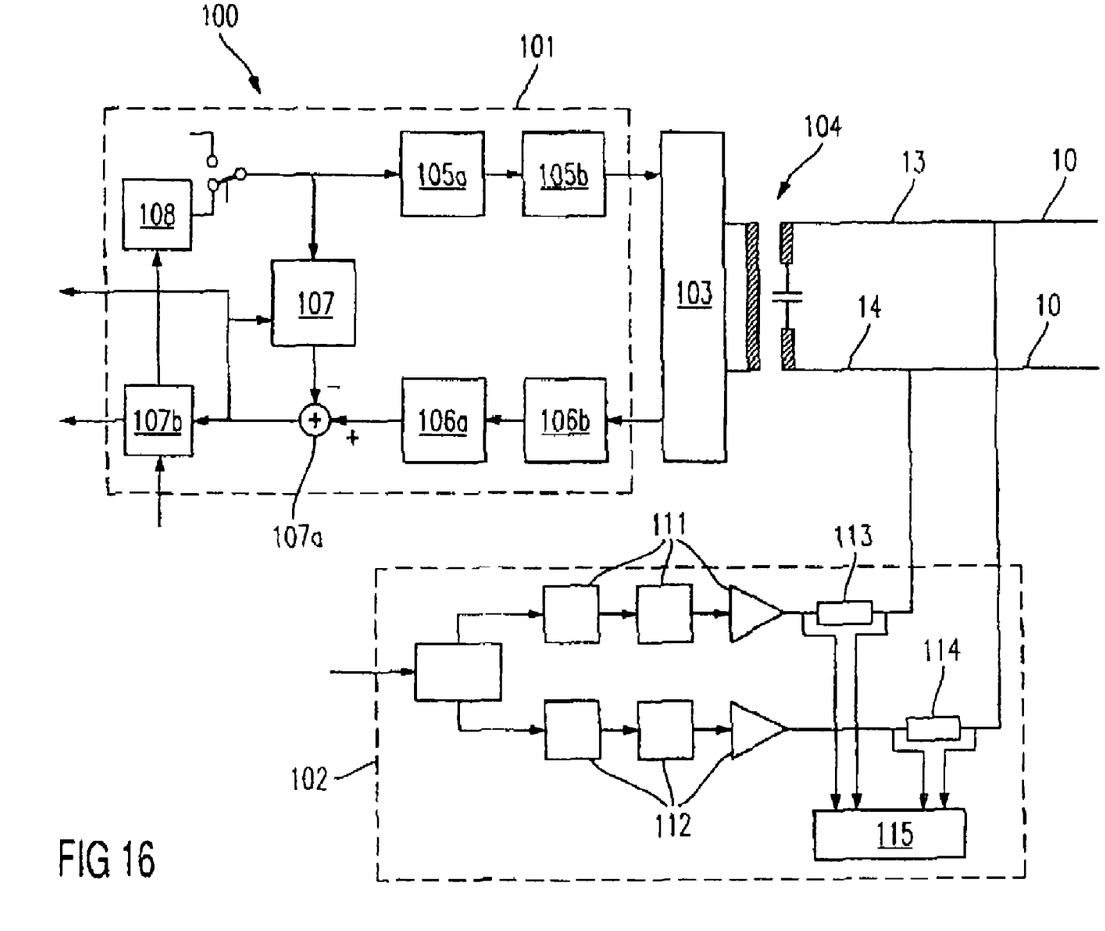
FIG. 16 shows a schematic illustration of assemblies of a DSL modem.

FIG. 16 shows a typical DSL module 100, as may be used. This has a sine-wave generator 108, which supplies the signal via a transmission filter 105*a* and the digital/analog converter 105*b* to the hybrid 103 (which also contains a line driver). The hybrid 103 is connected directly to a transformer 104, via which the signal is fed into the line 10 on both wires 13 and 14. The DSL module receives signals from the line 10 again via the transformer 104 and the hybrids 103, and supplies the separated signal via an analog/digital converter 106*b* and a reception filter 106*a* to the echo compensation device 107. This is normally used to actually separate its own reflected signal.

Some DSL cards 100 also have a line test device 102, as is illustrated in FIG. 16. This is able to pass analog signals (which are produced by means of signal generation devices 111 and 112) to the line 10, in order in this way to carry out fundamental functional tests of the line. For this purpose, by way of example, measured values which are dropped across resistors 113 and 114 are evaluated by means of an evaluation apparatus 115. The test may comprise simple resistance tests or the like (metallic loop test).

In order to carry out the method, the AM modulators in the transmission path can be used to produce the sinusoidal measurement signals. The reception path comprises the ADC 106*b* (analog/digital converter), the downsampling from the ADC sampling rate to the symbol rate, the RX filter 106*a* and the echo compensation 107. The echo compensation comprises the actual FIR echo compensator filter 107 and the adder 107*a*, which, in the data mode, subtracts the echo which is simulated by the echo compensator filter, from the filtered received signal (that is to say switched off in the method). For adaptation, the remaining echo is supplied, downstream from the adder, to the adaptation part of the echo compensator filter. Furthermore, the reception path has an r*4 kHz demodulator 107*b*, by means of which the data can be recovered during the G.hs procedure.

The arrangement of the hybrid and transformer likewise corresponds to the normal application. The transformer winding is split on the loop side, and the winding elements are connected to a capacitor in order to avoid a short circuit during power feeding. In this case, the hybrid should also contain the line driver, which may have an internal resistance Ri.

The method for detection in the transceiver will be described in the following text: transmission of a sine-wave signal. TX and RX filters connected as bandpass filters. Echo compensation switched off, that is to say Ure=Ur. Demodulation of the "echo" and measurement of the amplitude of the demodulated signal.

In all of the measurements, the gain factors during transmission and reception and the internal resistance Ri remain the same. The voltage of the line start and thus also the complex value of the "echo" is obtained from the voltage split between Ri and the complex Zc transformed via the transformer and the hybrid. For lines which have load coils, the profile of the "echo" is different from that on lines which do not have load coils, and the demodulated signal is correspondingly different. It is thus possible to identify the presence of load coils from, for example, the profile of the demodulated signal.

The input resistance of the loop (line) is thus measured indirectly by measurement of the received signal. The relationship between the received signal and the transmission signal is measured as the transfer function.

The line test device 102 likewise has line drivers which— controlled by "settings" by the HOST—can, for example, pass differential sine-wave tones to the line. The current can be measured at the driver outputs.

The following text describes how the method can be carried out using the test device:

A differential sine-wave signal of constant amplitude is transmitted, and the amplitude of the driver current is measured. This is different in the case of lines with load coils than in the case of lines without such coils, if the frequency is in a range in which the two characteristic impedances differ to a major extent (at low frequencies). It is thus possible to detect load coils.

Both specific methods are based on the assumption that the line is open at the end and is terminated by a telecommunications system which is currently not active, so that the input impedance of the line is not "corrupted" by a terminating impedance (which is generally in the region of 135 ohms).

FIG. 17 once again shows the various areas in which the method is carried out. First of all, the hardware which is used in DSL modems—as already described—is used for measurement. The measurement signals 134 and 135 which are tapped off can be evaluated both by software and by special hardware 131. The subsequent evaluation 132 of the analysis results, which finally produces the result "load coils present/ not present", is generally in the form of software.

The input resistance of the line can be measured only indirectly with the aid of the modem: in fact, the entire input impedance of the hybrid is always measured. Since the transformer impedance has a very major effect on this, the difference in the magnitudes of the input resistances of the hybrid are only very small between lines with or without load coils. It is very difficult to evaluate the measurement results.

Figure 17:
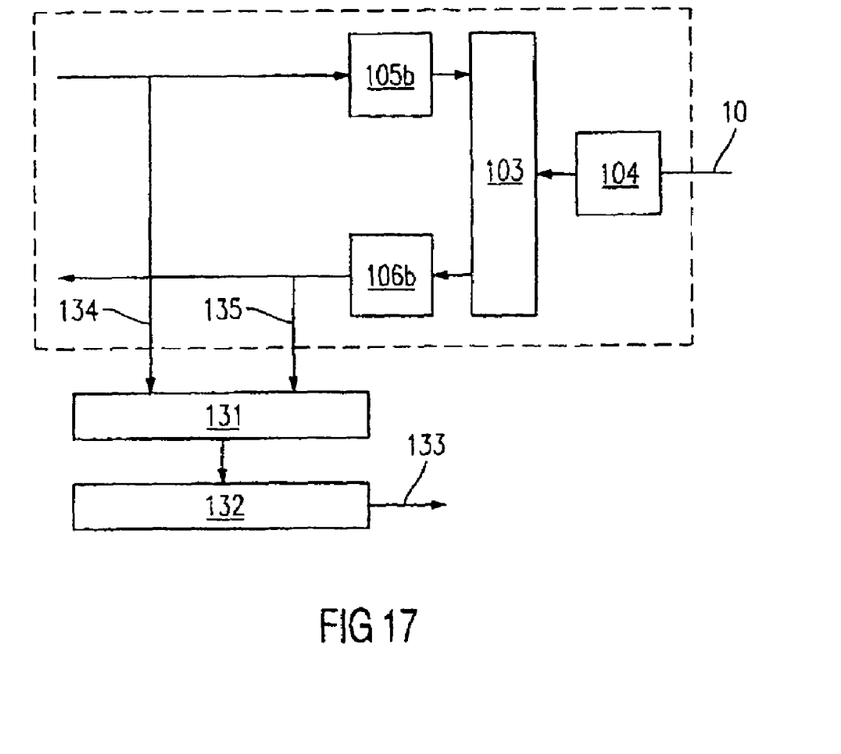
FIG. 17 shows a schematic illustration of those assemblies of the DSL modem which are involved in the evaluation process.

The detection of load coils can thus be carried out, in particular, by measurement of the profile of the phase of the input resistance of the hybrid in the frequency range from 1.5 to 5 kHz, and by determination of the gradients. The measurements could be carried out with a step width of 100 to 200 Hz.

Figure 18:
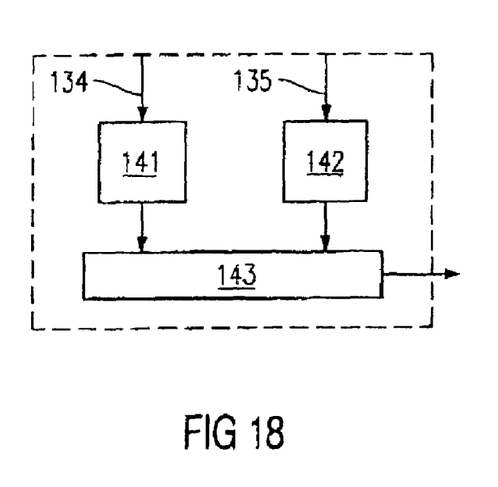
FIG. 18 shows a module which is involved in the analysis based on a first example.
Figure 19:
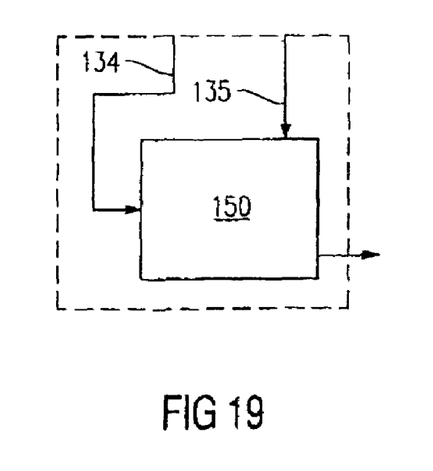
FIG. 19 shows a module which is involved in the analysis based on a second example.

FIG. 18 and FIG. 19 show two different apparatuses for analysis of the phase profile, that is to say for formation of phase difference measured values over the frequency. In the first variant (FIG. 18), the mathematical sign (141, and 142) is in each case formed from the transmission signal 134 and from the received signal 135, which are sinusoidal and have no DC voltage component, and are supplied to a (digital) phase discriminator 143. One specific embodiment relating to this will be described further below (FIGS. 20 and 21).

The variant in FIG. 19 shows a quadrature demodulator 150 for formation of phase difference measured values, which carries out quadrature demodulation of the received signal, with the transmission signal (test signal) being used as the carrier.

Figure 20:
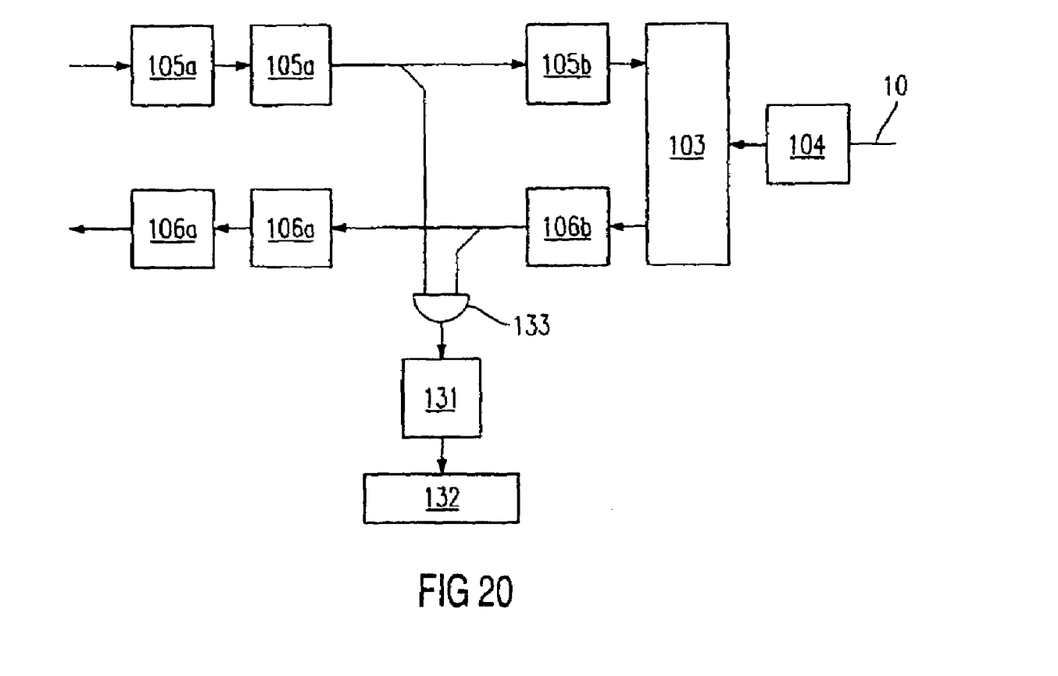
FIG. 20 shows a schematic illustration of the DSL modem assemblies which are involved in the evaluation process for phase difference measurement.
Figure 21:
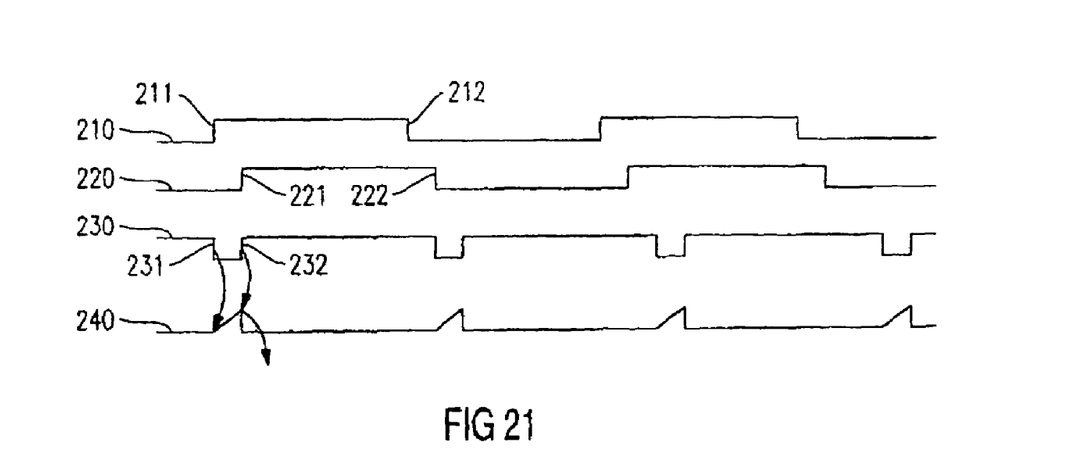
FIG. 21 shows a schematic illustration of signal profiles for phase difference measurement.

FIG. 20 shows one embodiment for phase measurement using the modem hardware and a simple additional circuit. The corresponding signals are shown in FIG. 21. The production and TX filtering of the symbols are carried out such that a sinusoidal transmission signal, without any DC voltage component, is produced at frequencies from 1.5 kHz to 5 kHz. Corresponding to the voltage split between the line driver internal resistance and the hybrid input impedance, which includes the input impedance of the line 10, this results in a sinusoidal received signal downstream from the analog/digital converter 106b. If the discrete-amplitude transmission signal and received signal are coded using two's complement form, only the most significant bits (that is to say the mathematical signs 210 and 220, which each have a flank 211, 212 and 221, 222 when the mathematical sign changes) are in each case determined and passed on, by supplying them to an exclusive-NOR gate 133. The output signal 230 with the corresponding flanks 231 and 232 of this gate 133 is filtered by means of a low-pass filter 131, whose cut-off frequency is, for example, 100 Hz. The output signal 240 from the low-pass filter is a measure of the phase difference between the transmission signal and the received signal, and can be written for each measurement to a register 132 which can be read by software. The exclusive-NOR gate and the low-pass filter represent a simple coincidence detector.

| List of reference symbols | |
|---|---|
| 10 | Line |
| 11, 12 | Feed points |
| 13, 14 | Wires |
| 15, 16 | Load coils |
| 17 | End of the line |
| 18 | End of the line section |
| Zo, Zc | Characteristic impedance |
| 21 | Resistance |
| 22 | Coil |
| 23 | Capacitor |
| 30 | Switching element |
| 31 | Resistor |
| 32 | Capacitor |
| 41 | Real part of Zo |
| 42 | Imaginary part of Zo |
| 43 | Real part of Zc |
| 44 | Imaginary part of Zc |
| a | Value profile of the open line |
| b | Value profile of the load coil |
| c | Value profile of the connected line |
| 91 | Derivative of the profile |
| 92 | Averaging |
| 93 | Data reduction |
| 94 | Second derivative of the profile |
| 95 | Search for a mathematical sign change |
| 96 | Mathematical sign change, yes |
| 97 | Mathematical sign change, no |
| 100 | DSL Module |
| 101 | Transceiver |
| 102 | Line test device |
| 103 | Hybrid |
| 104 | Transformer |
| 105a | Transmission filter |
| 105b | Digital/analog converter |
| 106b | Analog/digital converter, ADC |
| 106a | Reception filter, RX filter |
| 107 | Echo compensation device |
| | FIR echo compensator filter |
| 107a | Adder |
| 107b | r*4kHz demodulator |
| 108 | Sine-wave generator |
| 111 and 112 | Signal generation devices |
| 113 and 114 | Resistors |
| 115 | Evaluation apparatus |
| Ri | Internal resistor |
| 134 and 135 | Measurement signals |
| 131 | Specific hardware, low-pass filter |
| 132 | Evaluation, register |
| 133 | Gate, exclusive-NOR gate |
| 134 | Transmission signal |
| 135 | Received signal |
| 141, 142 | Mathematical sign formation |
| 143 | Phase discriminator |
| 150 | Quadrature demodulator |
| 210 and 220 | Most significant bits (mathematical sign) |
| 211, 212 | Flank |
| 221, 222 | Flank and |
| 230 | Output signal |
| 231 and 232 | Flanks |
| 240 | Output signal of the low-pass filter |

The invention claimed is:

1. A method of qualification of telephone lines as signal conductors for suitability for data transmissions, comprising:

(a) providing, for each of a plurality of frequencies within a preselected frequency range, a test signal into a telephone line and measuring a reflection signal of the test signal, the reflection signal constituting a portion of the test signal reflected on the input impedance of the telephone line, said measuring including measuring any phase shift in the reflection signal with respect to the test signal at the respective frequency, (b) determining a first derivative of the phase shift as a function of frequency;

(c) determining a second derivative of the phase shift as a function of the frequency, (d) determining if the second derivative has at least one mathematical sign change;

(e) outputting an indication of a suitability state based on whether at least one mathematical sign change is determined to exist in the second derivative.

2. The method of qualification of telephone lines according to claim 1, wherein each test signal comprises a sinusoidal AC voltage.

3. The method of qualification of telephone lines according to claim 1, wherein, step a) further comprises employing a phase discriminator to measure any phase shift in the reflection signal.

4. The method of qualification of telephone lines according to claim 1, wherein step a) further comprises employing a quadrature demodulator to measure any phase shift in the reflection signal.

5. The method of qualification of telephone lines according to claim 1, wherein the preselected frequency range is substantially from 1.0 kHz to 5.0 kHz.

6. The method of qualification of telephone lines according to claim 1, wherein the plurality of frequencies comprises a sequence of frequencies having logarithmic intervals between individual frequencies of the sequence of frequencies.

7. The method of qualification of telephone lines according to claim 1, further comprising, prior to step c), averaging individual phase shifts, in order to smooth them in a profile.

8. The method of qualification of telephone lines according to claim 7, further comprising, carrying out median formation in the averaging of individual phase shifts.

9. The method of qualification of telephone lines according to claim 8, further comprising, prior to step c), generating smoothed phase shifts at regular intervals from each other.

10. The method of qualification of telephone lines according to claim 1, wherein the indication of a suitability state comprises an indication that load coils are detected in the telephone line.

11. The method of qualification of telephone lines as signal conductors for suitability for data transmissions, comprising:

(a) using a DSL modem to provide, for each of a plurality of frequencies within a preselected frequency range, a test signal into a telephone line, (b) measuring a reflection signal of the test signal, the reflection signal constituting a portion of the test signal reflected on the input impedance of the telephone line, said measuring including measuring any phase shift in the reflection signal with respect to the test signal at the respective frequency, (c) determining a first derivative of the phase shift as a function of frequency;

(d) determining a second derivative of the phase shift as a function of the frequency, (e) determining if the second derivative has at least one mathematical sign change;

(f) outputting an indication of a suitability state based on whether at least one mathematical sign change is determined to exist in the second derivative.

12. The method according to claim 11, wherein step a) further comprises using an existing test module of the DSL modem to provide, for each of the plurality of frequencies within the preselected frequency range, the test signal into the telephone line.

13. The method according to claim 11, wherein the DSL modem is at least one of the group consisting of: an ISDN modem, a VDSL modem, an ADSL modem, an SHDSL modem and an SDSL modem.

14. A method of qualification of telephone lines as signal conductors for suitability for data transmissions, comprising:

(a) providing, for each of a plurality of frequencies within a preselected frequency range, a test signal into a telephone line and measuring a reflection signal of the test signal, the reflection signal constituting a portion of the test signal reflected on the input impedance of the telephone line, said measuring including measuring any phase shift in the reflection signal with respect to the test signal at the respective frequency, (b) determining a first derivative of the phase shift as a function of frequency;

(c) filtering the first derivative;

(d) determining a second derivative of the phase shift as a function of the frequency, (e) determining if the second derivative has at least one mathematical sign change;

(f) outputting an indication of a suitability state based on whether at least one mathematical sign change is determined to exist in the second derivative.

15. The method of qualification of telephone lines according to claim 14, wherein the preselected frequency range is substantially from 1.0 kHz to 5.0 kHz.

16. The method of qualification of telephone lines according to claim 14, wherein the plurality of frequencies comprises a sequence of frequencies having logarithmic intervals between individual frequencies of the sequence of frequencies.

17. The method of qualification of telephone lines according to claim 14, wherein step c) further comprises averaging subsets of the first derivatives in order to smooth them in a profile.

18. The method of qualification of telephone lines according to claim 17, further comprising, carrying out median formation in the averaging of subsets of the first derivatives.

19. The method of qualification of telephone lines according to claim 18, wherein step c) further comprises generating smoothed phase shifts at regular intervals from each other.

20. The method of qualification of telephone lines according to claim 14, wherein the indication of a suitability state comprises an indication that load coils are detected in the telephone line.

* * * * *